Oct. 4, 1960     S. A. MINERA     2,954,845
TEMPERATURE ACTUATED LUBRICATING DEVICE
Filed June 11, 1957
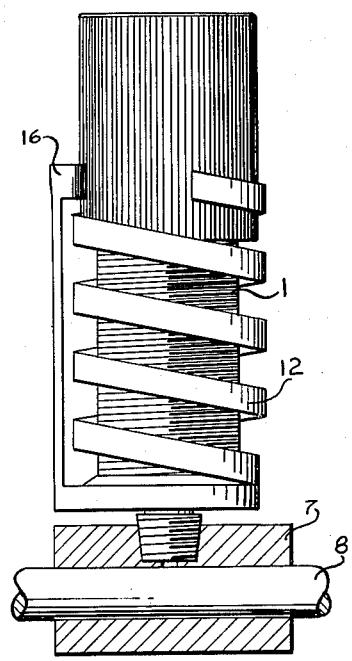
FIG_1
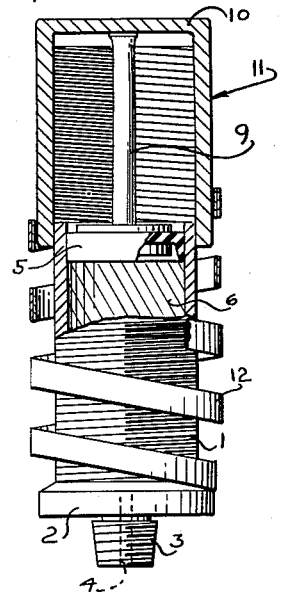
FIG_2
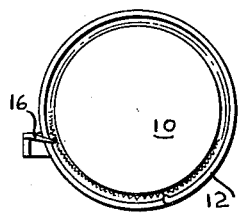
FIG_3
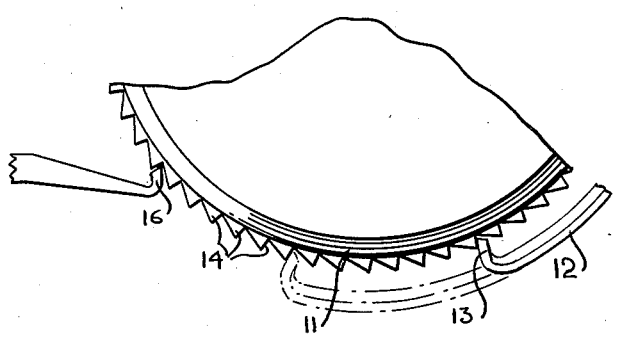
FIG_4
*INVENTOR.*
SALVADOR A. MINERA
BY
*Boyken, Mohler & Wood*
ATTORNEYS

2,954,845
TEMPERATURE ACTUATED LUBRICATING DEVICE

Salvador A. Minera, 61 Garcia Ave.,
San Francisco, Calif.

Filed June 11, 1957, Ser. No. 665,080

2 Claims. (Cl. 184—37)

This invention relates to a temperature actuated lubricating device, and has for one of its objects the provision of a device adapted to discharge lubricant therefrom with each alternate reversal in temperature. Thus when the atmospheric temperature goes down or when it goes up, according to how the device is constructed, there will be a discharge of lubricant from the device, and inasmuch as there is normally a change in temperature from a higher to a lower temperature and back again, once during each twenty-four hours, there will be a discharge of lubricant once during each twenty-four hours.

One of the objects of the invention is the provision of a lubricating device that will automatically discharge lubricant under pressure at least once during each twenty-four hours provided there is a reversal in the temperature within each twenty-four hours, and which device will automatically discharge lubricant therefrom under pressure during a temperature change in one direction.

Other objects and advantages will appear in the description and in the drawings.

In the drawings Fig. 1 is a side elevational view illustrating one embodiment of the invention.

Fig. 2 is a part sectional and part elevational view of the device of Fig. 1.

Fig. 3 is a top plan view of the device of Fig. 1.

Fig. 4 is a greatly enlarged, fragmentary top plan view of a portion of the device of Fig. 1.

In detail, the device illustrated in the drawings comprises a cylindrical externally threaded body 1 having a head 2 at one end provided with a conventional fitting 3 having a discharge aperture 4 (Fig. 2) therethrough for discharge of lubricant therefrom.

This container is adapted to contain a lubricant and the end thereof opposite to the head 2 is provided with a piston 5 that is reciprocable within said body. The lubricant, indicated at 6 in Fig. 2 is between the piston and the head 2 and it is obvious that upon movement of the piston toward head 2 the lubricant 6, which is normally grease, will be placed under pressure and will be forced out of the discharge aperture. Thus when the fitting 3 is screwed into one side of a bearing 7, the lubricant 6 will be forced into the bearing to lubricate the adjacent surfaces of the bearing and a shaft 8 that is supported in said bearing (Fig. 1).

The piston 5 is provided with a rod 9 connecting it with the head 10 of a cap 11, said cap having internal threads in threaded engagement with the outer threaded sides of the container 1.

A helical metal element 12 is coaxial with the container 1 and is rigidly connected with the body of the container at one end, preferably with the head 2. The space between the coils of the element 1 is sufficient to clear the sides of cap 11, and the other end 13 of said element (Fig. 4) is in the form of a tooth directed toward the side of cap 11 and in engagement with the outer side of the latter.

Said outer side of the cap 11 is formed with a circumferentially extending row of relatively closely spaced ratchet teeth 14 (Fig. 4) so that movement of the tooth 13 circumferentially of the cap in one direction will engage one of the teeth 14 for rotating the cap in one direction, while movement of the tooth 13 in the opposite direction will result in the tooth 13 sliding over teeth 14 provided the cap is held against reverse rotation.

A spring pawl 16 also rigid with the container 1 is provided for engagement with the teeth 14 to prevent any reverse rotation of the cap after the tooth 13 has rotated the cap in one direction and then moves back toward its original position.

This movement of tooth 13 is solely caused by the linear expansion of the helical element 12. Upon a rise in atmospheric temperature or upon the device being heated by steam or any other source of heat, the element 12 will lengthen thus moving tooth 13 in one direction, thereby rotating the cap 11, and when the element 12 cools, the tooth 13 will move back preparatory to again expanding and again rotating the cap 11.

In many plants, such as in the fruit canning industry, the machines are periodically steam cleaned, and with each cleaning there is a substantial heating of all parts of the machine so cleaned, including the grease cups or parts where the present devices would be positioned.

Normal atmospheric changes each twenty-four hours is adequate to provide sufficient linear movement of the tooth 13 to pass over one or more of the teeth 14 and to rotate the cap. The length of the helical element is such as to insure the desired degree of movement.

In order to insure against any stresses or molecular arrangement in element 12 that might cause the tooth 13 to move away from the teeth 14, the helical element 12 may be a bimetallic element in which the inner layer has a slower rate of expansion than the outer. This will insure positive engagement of tooth 13 with the teeth 14 at all times.

It is, of course, obvious that the ratchet teeth 14 and the tooth 13 and pawl 16 could have reverse shapes so that a cooling of the element 12 would result in tooth 13 pulling the cap around instead of pushing it. Either arrangement would be the same insofar as the result is concerned.

I claim:

1. A lubricating device comprising: a tubular container for enclosing a body of lubricant, said container including a head at one end thereof having an aperture for discharge of such lubricant therefrom and a piston within said container at the end thereof opposite to said head and spaced from said head, the space between said piston and said head being adapted to contain said lubricant, means threadedly secured to said container at the end that is opposite to said aperture for movement toward said head upon rotation of said means in one direction, an element on said container outside the latter and connected therewith and exposed to the temperature of the air around said container, said element including a portion thereof movable in one direction upon a predetermined change in the temperature of said container and of said arm around said container, said element being in engagement with said means for moving said means in said one direction upon said predetermined change in temperature.

2. A lubricating device comprising: a tubular container having a head at one end thereof provided with a discharge aperture, and the opposite end of said container being open, a helical metal element coaxial with and around said container, one end of said element being rigid with said container and the other end thereof being adjacent to said opposite end of said container, a piston within said opposite end of said container movable toward said head, a cap extending over said opposite end of said container connected with said piston and threadedly connected with said container for movement toward said head upon rotation of said cap in one direction, said cap being provided with a circumferential row of ridges therearound coaxial with said container, said element being longitudinally extensible upon a predetermined change in temperature for movement of said other end thereof circumferentially in one direction around said cap and said other end being in engagement with one of said ridges for rotating said cap in said one direction upon such predetermined change in temperature.

References Cited in the file of this patent

UNITED STATES PATENTS

| | | |
|---|---|---|
| 1,106,273 | Backus | Aug. 4, 1914 |
| 1,325,248 | Jockmus | May 17, 1919 |
| 2,007,482 | Stitt | July 9, 1935 |
| 2,091,255 | Coleman et al. | Aug. 31, 1937 |
| 2,197,125 | Cox | Apr. 16, 1940 |
| 2,572,162 | Koonz | Mar. 8, 1947 |